US012798931B2

(12) United States Patent
Sakata et al.

(10) Patent No.: US 12,798,931 B2
(45) Date of Patent: Nov. 17, 2026

(54) DRIVE TRANSMISSION DEVICE AND LIFTING DEVICE EQUIPPED WITH THE SAME

(71) Applicant: Daifuku Co., Ltd., Osaka (JP)

(72) Inventors: Takumi Sakata, Shiga (JP); Takeshi Abe, Shiga (JP)

(73) Assignee: Daifuku Co., Ltd., Osaka (JP)

(*) Notice: Subject to any disclaimer, the term of this patent is extended or adjusted under 35 U.S.C. 154(b) by 38 days.

(21) Appl. No.: 19/089,364

(22) Filed: Mar. 25, 2025

(65) Prior Publication Data

US 2025/0313435 A1 Oct. 9, 2025

(30) Foreign Application Priority Data

Apr. 3, 2024 (JP) ................................ 2024-060380

(51) Int. Cl.
*B66D 1/20* (2006.01)
*B66D 1/26* (2006.01)

(52) U.S. Cl.
CPC *B66D 1/20* (2013.01); *B66D 1/26* (2013.01)

(58) Field of Classification Search
CPC ... B66D 1/20; B66D 1/26; B66D 3/18; B66D 3/20; B66D 1/14
USPC .......................................................... 254/294
See application file for complete search history.

(56) References Cited

U.S. PATENT DOCUMENTS

| | | | | |
|---|---|---|---|---|
| 2,832,485 A * | 4/1958 | Schneider | B66D 1/26 | 414/691 |
| 3,279,762 A * | 10/1966 | Bruns | B66B 15/04 | 474/178 |
| 3,738,614 A * | 6/1973 | Peterson | F16D 55/32 | 254/365 |
| 5,423,628 A * | 6/1995 | Jaworski | E01C 19/40 | 404/114 |
| 6,345,724 B1 * | 2/2002 | Masumoto | B66C 13/06 | 212/320 |
| 7,766,307 B2 * | 8/2010 | Urciuoli | B66D 1/7405 | 254/374 |
| 8,251,351 B2 * | 8/2012 | Roodenburg | B66D 1/225 | 254/297 |
| 8,317,159 B2 * | 11/2012 | Hoffend, III | F16M 13/022 | 160/331 |

(Continued)

FOREIGN PATENT DOCUMENTS

| | | |
|---|---|---|
| FI | 92574 | * 12/1993 |
| JP | 7-207972 | * 8/1995 |

(Continued)

*Primary Examiner* — Paul T Chin

(74) *Attorney, Agent, or Firm* — Kaplan Breyer Schwarz, LLP

(57) ABSTRACT

A drive transmission device includes a reference shaft positioned on a reference axis, a first target shaft and a second target shaft positioned on a target axis, a first rotator attached to the first target shaft, a second rotator attached to the second target shaft, a first transmission member wound around the first rotator, a second transmission member wound around the second rotator, and a shaft coupling. The first target shaft and the second target shaft are arranged with a gap in the axial direction, and the first rotator and the second rotator are positioned on the target axis to be arranged side by side in the axial direction. The shaft coupling is connected to both the first rotator and the second rotator.

4 Claims, 7 Drawing Sheets

(56) References Cited

U.S. PATENT DOCUMENTS 8,616,340 B2 * 12/2013 Peacock .................. B66B 19/00
52/741.1
10,220,921 B1 * 3/2019 McConnell ........... B66C 23/705

FOREIGN PATENT DOCUMENTS

JP 2004-067348 A 3/2004
JP 2019-143772 A 8/2019

* cited by examiner

DRIVE TRANSMISSION DEVICE AND LIFTING DEVICE EQUIPPED WITH THE SAME

CROSS-REFERENCE TO RELATED APPLICATIONS

This application is based on and claims priority from Japanese Patent Application No. 2024-060380, filed on Apr. 3, 2024, with the Japan Patent Office, the disclosure of which is incorporated herein in its entirety by reference.

TECHNICAL FIELD

The present disclosure relates to a drive transmission device and a lifting device equipped with the drive transmission device.

BACKGROUND

Japanese Patent Laid-Open Publication No. 2004-067348 discloses a substrate transfer device for transferring printed circuit boards, which uses a drive transmission device that transmits a driving force generated by a motor. In the following description of the background, the reference numerals refer to those in Japanese Patent Laid-Open Publication No. 2004-067348.

In Japanese Patent Laid-Open Publication No. 2004-067348, driving pulleys 14A and 14B that drive transfer belts 13A and 13B are connected to rotate integrally via a single belt drive shaft 20, and are configured to rotate synchronously on the same axis by the rotation of the belt drive shaft 20.

The belt drive shaft 20 includes a pair of drive shafts 20a and 20b arranged on the same axis with a gap 25 therebetween. These drive shafts 20a and 20b are directly connected by a shaft coupling 26. The shaft coupling 26 is removable from the drive shafts 20a and 20b. The gap 25 exposed by removing the shaft coupling 26 is used when removing the transfer belt 13A from a substrate transfer device 1, such as during maintenance. Specifically, the transfer belt 13A may be removed from the substrate transfer device 1 by inserting the transfer belt 13A through the gap 25.

SUMMARY

A drive transmission device includes a reference shaft positioned on a reference axis, a first target shaft and a second target shaft, positioned on a target axis that is a separate axis parallel to the reference axis, a first reference rotator and a second reference rotator attached to the reference shaft, a first rotator attached to the first target shaft, a second rotator attached to the second target shaft, a first endless transmission member wound around the first reference rotator and the first rotator, a second endless transmission member wound around the second reference rotator and the second rotator, and a shaft coupling configured to connect the first target shaft and the second target shaft to each other. When a direction parallel to the reference axis and the target axis is defined as an axial direction, the first target shaft and the second target shaft are arranged with a gap in the axial direction, and the first rotator and the second rotator are positioned on the target axis so as to be arranged side by side in the axial direction. The shaft coupling is connected to both the first rotator and the second rotator.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
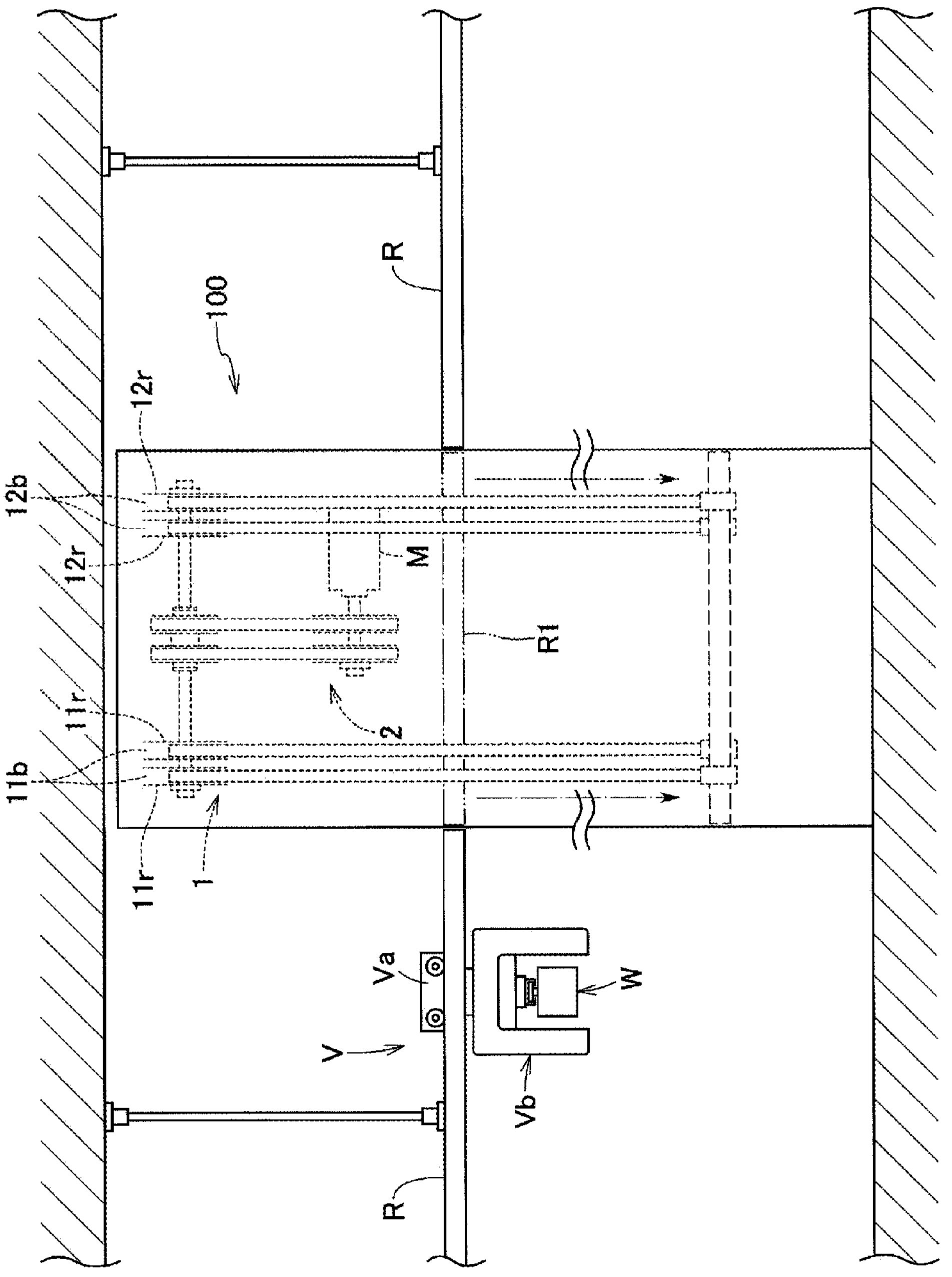
FIG. 1 is a diagram illustrating an example of the use of a lifting device.

In the following detailed description, reference is made to the accompanying drawings which form a part hereof. The illustrative embodiments described in the detailed description, drawings, and claims are not meant to be limiting. Other embodiments may be utilized, and other changes may be made without departing from the spirit or scope of the subject matter presented herein.

As described above, the pair of drive shafts 20*a* and 20*b* are directly connected by the shaft coupling 26. Therefore, in the configuration disclosed in Patent Document 1, the size of the shaft coupling 26 is restricted by the size and shape of the drive shafts 20*a* and 20*b*, which in turn tends to limit the flexibility of the shaft connection structure.

In light of the above situation, there is a need for a technology that allows for the high flexibility of connection between two shafts that are arranged on the same axis with a gap for inserting therethrough an endless transmission member, such as a belt, used in a drive transmission device.

A drive transmission device including a reference shaft positioned on a reference axis, a first target shaft and a second target shaft, positioned on a target axis that is a separate axis parallel to the reference axis, a first reference rotator and a second reference rotator attached to the reference shaft, a first rotator attached to the first target shaft, a second rotator attached to the second target shaft, a first endless transmission member wound around the first reference rotator and the first rotator, a second endless transmission member wound around the second reference rotator and the second rotator, and a shaft coupling configured to connect the first target shaft and the second target shaft to each other. When a direction parallel to the reference axis and the target axis is defined as an axial direction, the first target shaft and the second target shaft are arranged with a gap in the axial direction, and the first rotator and the second rotator are positioned on the target axis so as to be arranged side by side in the axial direction. The shaft coupling is connected to both the first rotator and the second rotator.

According to this configuration, since the first target shaft and the second target shaft are arranged with a gap in the axial direction, when replacing the first transmission member or the second transmission member, the first transmission member removed from the first rotator or the second transmission member removed from the second rotator may be easily removed through the gap between the first target shaft and the second target shaft by removing the shaft coupling to create a gap between the first rotator and the second rotator. Further, according to this configuration, instead of directly connecting the first target shaft and the second target shaft, the first target shaft and the second target shaft may be indirectly connected by connecting the first rotator and the second rotator using the shaft coupling. Therefore, the shaft coupling, which functions to connect the first target shaft and the second target shaft, may be subjected to fewer restrictions due to the size and shape of the first and second target shafts. Thus, according to this configuration, it is possible to achieve the higher flexibility of connection between the first target shaft and the second target shaft, which are arranged on the same axis with a gap for the insertion of the first transmission member or the second transmission member therethrough.

Further features and advantages of the technology disclosed herein will become more apparent from the following description of exemplary and non-limiting embodiments, which are described with reference to the drawings.

Hereinafter, embodiments of a drive transmission device and a lifting device equipped with the drive transmission device will be described with reference to the accompanying drawings.

FIG. 1 illustrates an example of a transfer facility. In the example illustrated in FIG. 1, the transfer facility includes a transfer vehicle V that transfers an article W. The transfer vehicle V includes a running unit Va that moves along a running rail R and an article holder Vb that holds the article W. The running rail R is located at an upwardly spaced position from the floor, and the transfer vehicle V is configured as a so-called ceiling transfer vehicle that moves in the vicinity of the ceiling. Such a transfer facility constitutes, for example, a part of a semiconductor manufacturing plant, and is used in a clean room that is kept under a clean environment. In this case, the article W may be a substrate accommodating container (so-called "Front Opening Unified Pod (FOUP)") for accommodating substrates (such as wafers or panels), or a reticle accommodating container (so-called "reticle pod") for accommodating reticles.

A lifting device 100 equipped with a drive transmission device 2 is provided in the transfer facility described above. However, this is merely an example, and facilities in which the drive transmission device 2 and the lifting device 100 equipped with the drive transmission device 2 are used are not limited to the transfer facility described above.

As illustrated in FIG. 1, the lifting device 100 equipped with the drive transmission device 2 includes a drive source M, a lifting mechanism 1 driven by the drive source M, and a lifting target object R1 that is raised or lowered by the lifting mechanism 1.

The drive source M includes a motor and a reducer. As will be described in detail later, the drive source M is configured to generate a driving force transmitted by the drive transmission device 2.

In the present embodiment, the lifting target object R1 is a rail-shaped member that supports the running unit Va of the transfer vehicle V. The lifting target object R1 is configured to be changed in position between a reference position, which is continuous with the running rail R, and a retracted position, which is farther away from the running rail R, by being raised or lowered by the lifting mechanism 1.

The lifting target object R1 is located at the same height as the running rail R when in the reference position, and is located lower than the running rail R when in the retracted position. When the lifting target object R1 is in the reference position, the transfer vehicle V is able to move from the running rail R to the lifting target object R1. Once the transfer vehicle V has moved onto the lifting target object R1, the lifting target object R1 moves from the reference position to the retracted position, thereby positioning the transfer vehicle V lower than the running rail R. The lifting device 100 is used, for example, during the maintenance of the transfer vehicle V.

The lifting mechanism 1 includes a first output rotator 11*r*, a second output rotator 12*r*, a first winding member 11*b* wound around the first output rotator 11*r* so as to be freely wound or unwound, and a second winding member 12*b* wound around the second output rotator 12*r* so as to be freely wound or unwound.

The first output rotator 11*r* and the second output rotator 12*r* are configured to output the driving force, generated by the drive source M, to raise or lower the lifting target object R1. In the present embodiment, multiple first output rotators 11*r* (e.g., two in the illustrated example) are arranged side by side on the same axis. Further, multiple second output rotators 12*r* (e.g., two in the illustrated example) are arranged side by side on the same axis.

The lifting target object R1 is raised as the first winding member 11*b* and the second winding member 12*b* are wound around the first output rotator 11*r* and the second output rotator 12*r*, respectively. The lifting target object R1 is lowered as the first winding member 11*b* and the second winding member 12*b* are unwound from the first output rotator 11*r* and the second output rotator 12*r*, respectively. In the present embodiment, the first winding member 11*b* and the second winding member 12*b* are connected to different locations on the lifting target object R1. This makes it easier to raise or lower the lifting target object R1 while maintaining it in a horizontal posture.

The first and second winding members 11*b* and 12*b* are configured, for example, using belts. In this case, the first and second output rotators 11*r* and 12*r* are configured using pulleys.

Figure 2:
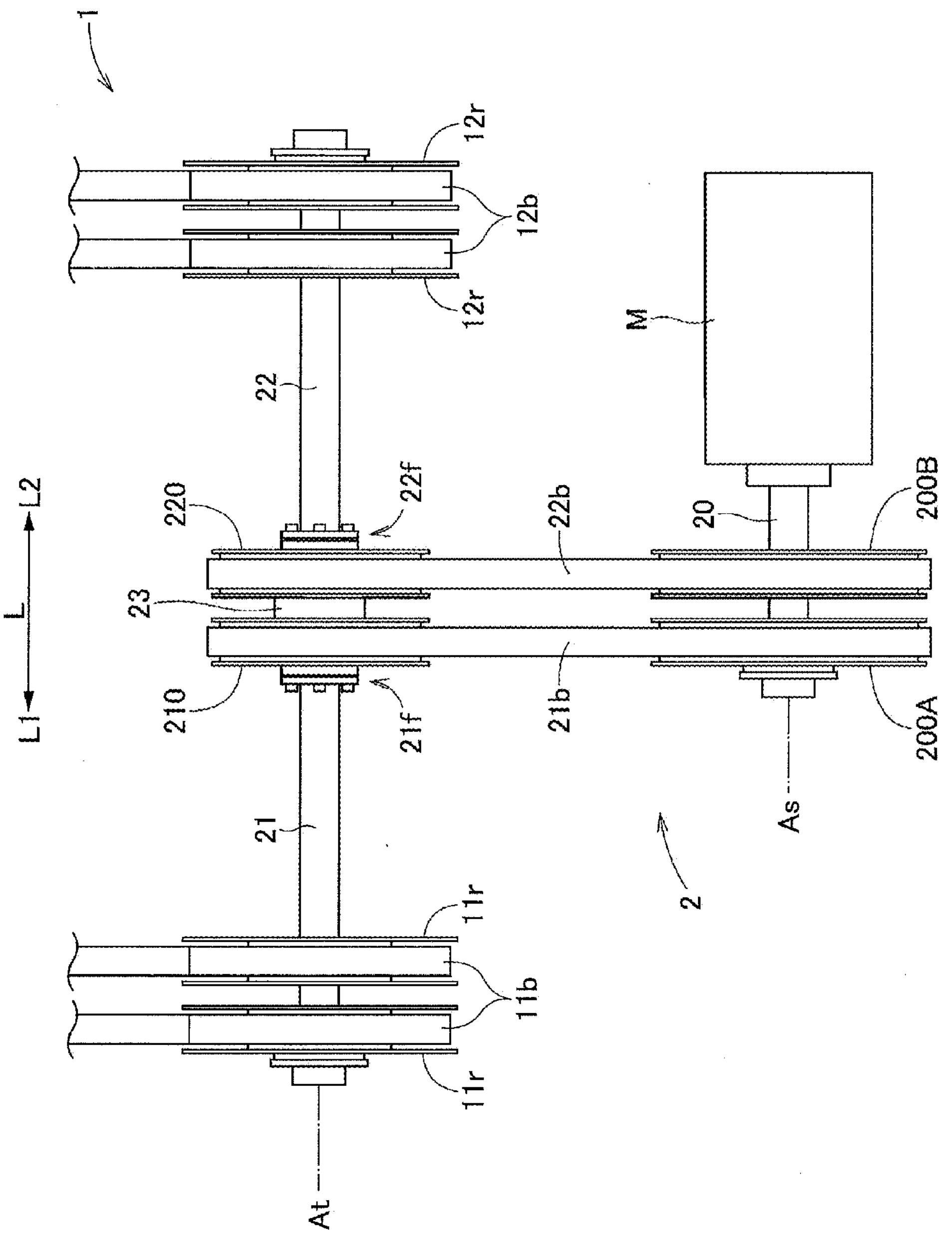
FIG. 2 is a schematic diagram of a drive transmission device.

FIG. 2 illustrates a schematic configuration of the drive transmission device 2. The drive transmission device 2 is configured to transmit a driving force through multiple shafts. These multiple shafts are arranged based on two mutually parallel axes. Here, one of the axes is referred to as "reference axis As" and the other axis is referred to as "target axis At."

Further, the direction parallel to the reference axis As and the target axis At is defined as the "axial direction L." One side in the axial direction L is defined as the "first axial side L1," while the other side is defined as the "second axial side L2."

As illustrated in FIG. 2, the drive transmission device 2 includes a reference shaft 20 positioned on the reference axis As, a first target shaft 21 and a second target shaft 22 positioned on the target axis At, which is a separate axis parallel to the reference axis As, a first reference rotator 200A and a second reference rotator 200B attached to the reference shaft 20, a first rotator 210 attached to the first target shaft 21, a second rotator 220 attached to the second target shaft 22, a first endless transmission member 21*b* wound around both the first reference rotator 200A and the first rotator 210, a second endless transmission member 22*b* wound around the second reference rotator 200B and the second rotator 220, and a shaft coupling 23 for connecting the first target shaft 21 and the second target shaft 22.

In the present embodiment, the reference shaft 20 is connected to the drive source M. The reference shaft 20 serves as an input shaft that receives the driving force generated by the drive source M.

The first reference rotator 200A and the second reference rotator 200B are fixed to the same reference shaft 20 and are configured to rotate synchronously with each other. In the present embodiment, the first reference rotator 200A and the second reference rotator 200B are configured using pulleys.

The first transmission member 21*b*, which is wound around the first reference rotator 200A on the reference axis As, is also wound around the first rotator 210 on the target axis At. This allows the driving force input to the reference shaft 20 to be transmitted to the first rotator 210 through the first transmission member 21*b*. In the present embodiment, the first transmission member 21*b* is configured using a belt. The first rotator 210 is also configured using a pulley, similar to the first reference rotator 200A.

The second transmission member 22*b*, which is wound around the second reference rotator 200B on the reference axis As, is also wound around the second rotator 220 on the target axis At. This allows the driving force input to the reference shaft 20 to be transmitted to the second rotator 220 through the second transmission member 22*b*. In the present embodiment, the second transmission member 22*b* is configured using a belt. The second rotator 220 is also configured using a pulley, similar to the second reference rotator 200B.

The first rotator 210 and the second rotator 220 are positioned on the target axis At so as to be arranged side by side in the axial direction L. In this example, the first rotator 210 and the second rotator 220 are arranged with a gap in the axial direction L. These first and second rotators 210 and 220 are attached to separate shafts, respectively. That is, the first rotator 210 is attached to the first target shaft 21, while the second rotator 220 is attached to the second target shaft 22.

The first rotator 210 is positioned on the first axial side L1 relative to the second rotator 220. The second rotator 220 is positioned on the second axial side L2 relative to the first rotator 210. In other words, the "first axial side L1" may be rephrased as the side where the first rotator 210 is positioned relative to the second rotator 220 in the axial direction L. The "second axial side L2" may be rephrased as the opposite side, i.e., the side where the second rotator 220 is positioned relative to the first rotator 210 in the axial direction L.

In the present embodiment, the driving force input to the first rotator 210 through the first transmission member 21*b* is transmitted to the first target shaft 21. The driving force input to the second rotator 220 through the second transmission member 22*b* is transmitted to the second target shaft 22.

In the present embodiment, the above-described first output rotator 11*r* is connected to the first target shaft 21 so as to rotate in conjunction with the first target shaft 21. The driving force input from the first rotator 210 to the first target shaft 21 is transmitted to the first output rotator 11*r* and then output to raise or lower the lifting target object R1 (see, e.g., FIG. 1). In addition, the first output rotator 11*r* may rotate integrally with the first target shaft 21, or may rotate synchronously at a constant transmission ratio.

In the present embodiment, the above-described second output rotator 12*r* is connected to the second target shaft 22 so as to rotate in conjunction with the second target shaft 22. The driving force input from the second rotator 220 to the second target shaft 22 is transmitted to the second output rotator 12*r* and then output to raise or lower the lifting target object R1 (see, e.g., FIG. 1). In addition, the second output rotator 12*r* may rotate integrally with the second target shaft 22, or may rotate synchronously at a constant transmission ratio.

In the present embodiment, a transmission path is formed to transmit the driving force generated from the drive source M in sequence through the reference shaft 20, the first and second transmission members 21*b* and 22*b*, and the first and second target shafts 21 and 22.

The first target shaft 21 and the second target shaft 22 are arranged with a gap in the axial direction L. The shaft coupling 23 positioned in this gap indirectly connects the first target shaft 21 to the second target shaft 22. To explain further, the shaft coupling 23 is connected to both the first rotator 210 and the second rotator 220. In other words, the shaft coupling 23 connects the first rotator 210, which is attached to the first target shaft 21, to the second rotator 220, which is attached to the second target shaft 22. As a result, the first target shaft 21 and the second target shaft 22 are indirectly connected to each other.

In this way, by fixing the first rotator 210 and the second rotator 220 to each other instead of directly fixing the first target shaft 21 and the second target shaft 22 to each other, both the shafts may be indirectly fixed to each other at positions away from the shaft center (radial outward positions). This makes it easier to increase rigidity against shaft deflection.

The shaft coupling 23 is configured using a coupling that functions to allow for the eccentricity and tilt of the first target shaft 21 and the second target shaft 22. However, it may not have such a function.

Figure 3:
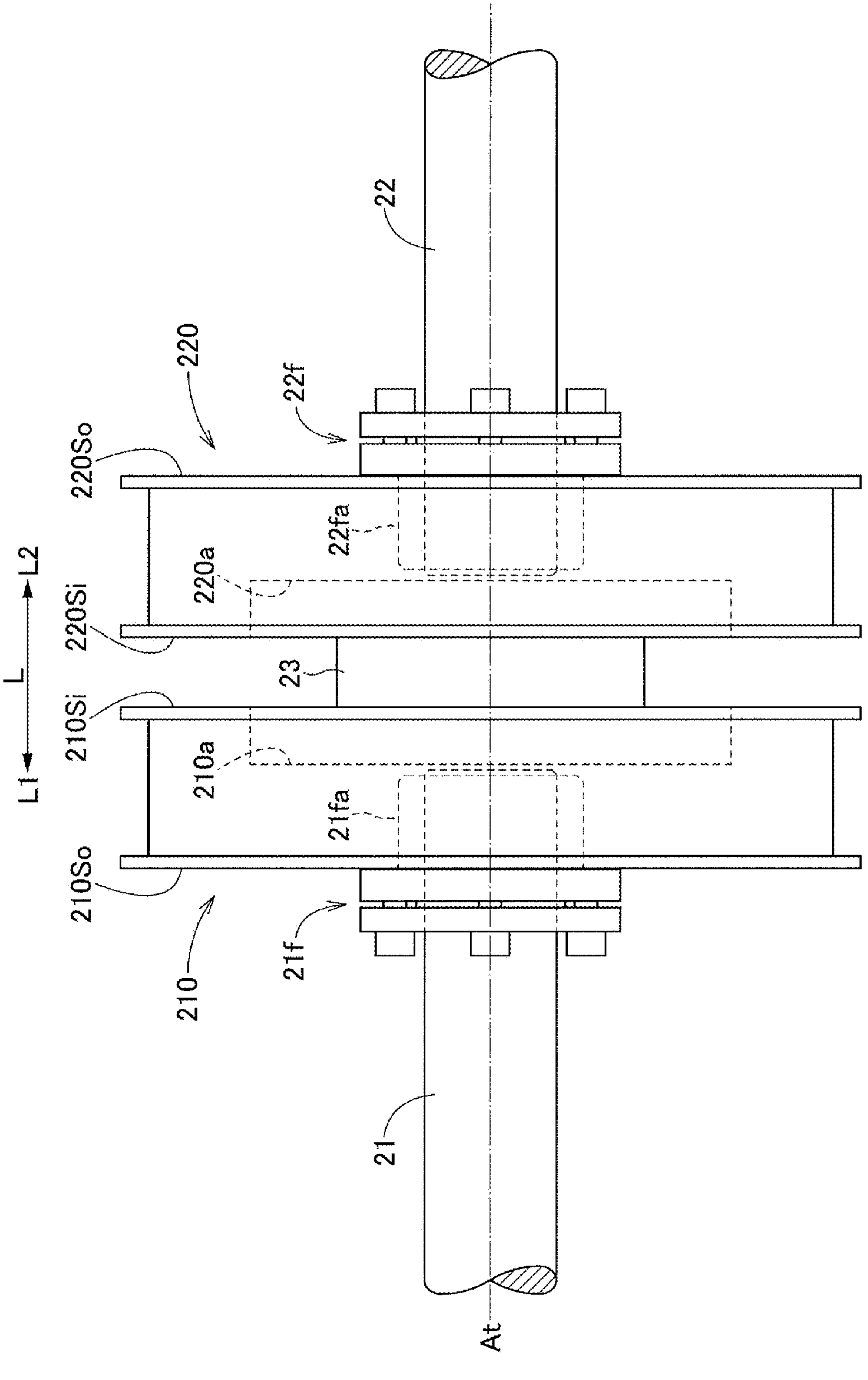
FIG. 3 is a diagram illustrating a connection structure between a first target shaft and a second target shaft.
Figure 4:
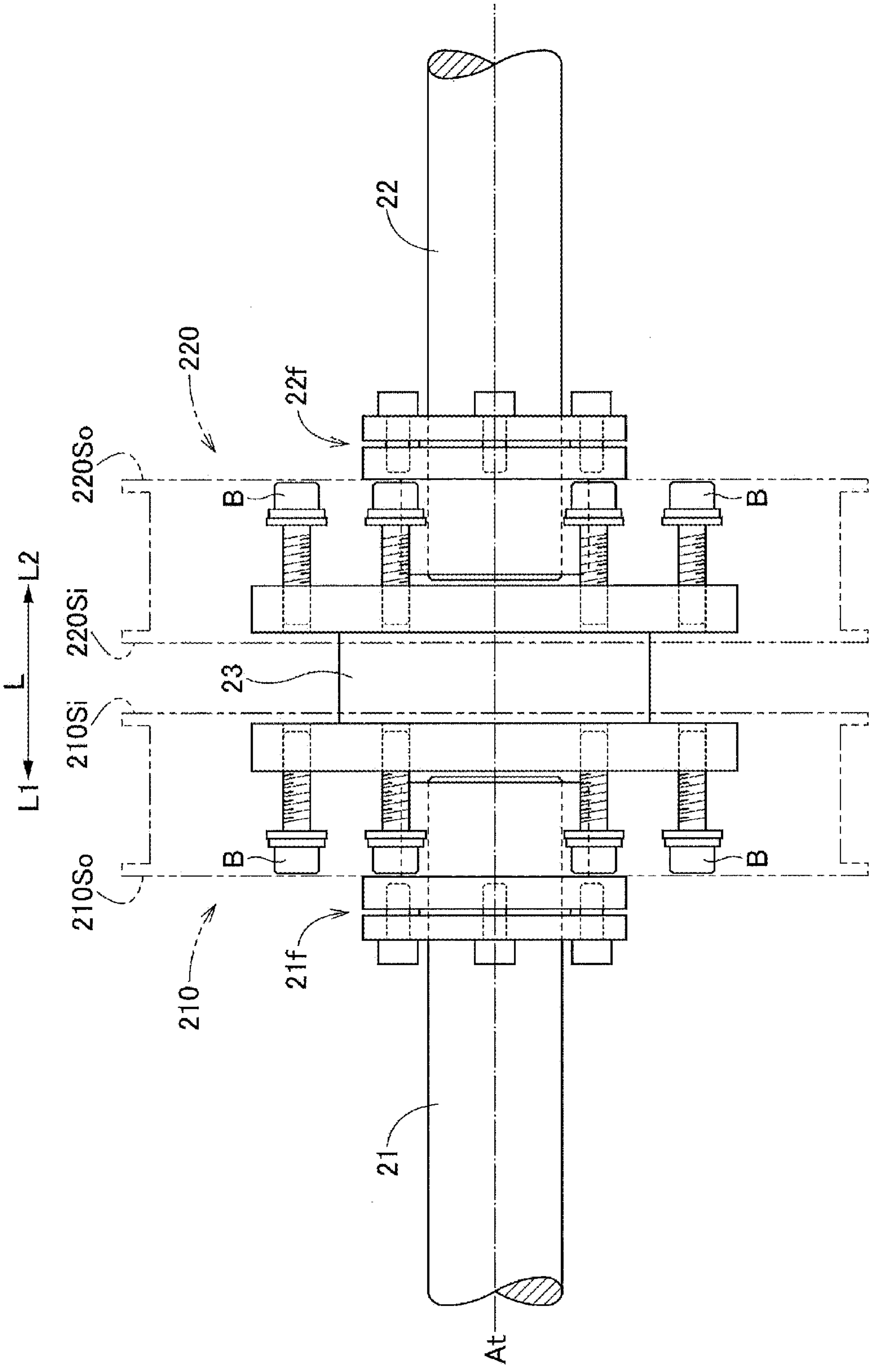
FIG. 4 is a diagram illustrating the connection structure between the first target shaft and the second target shaft.
Figure 5:
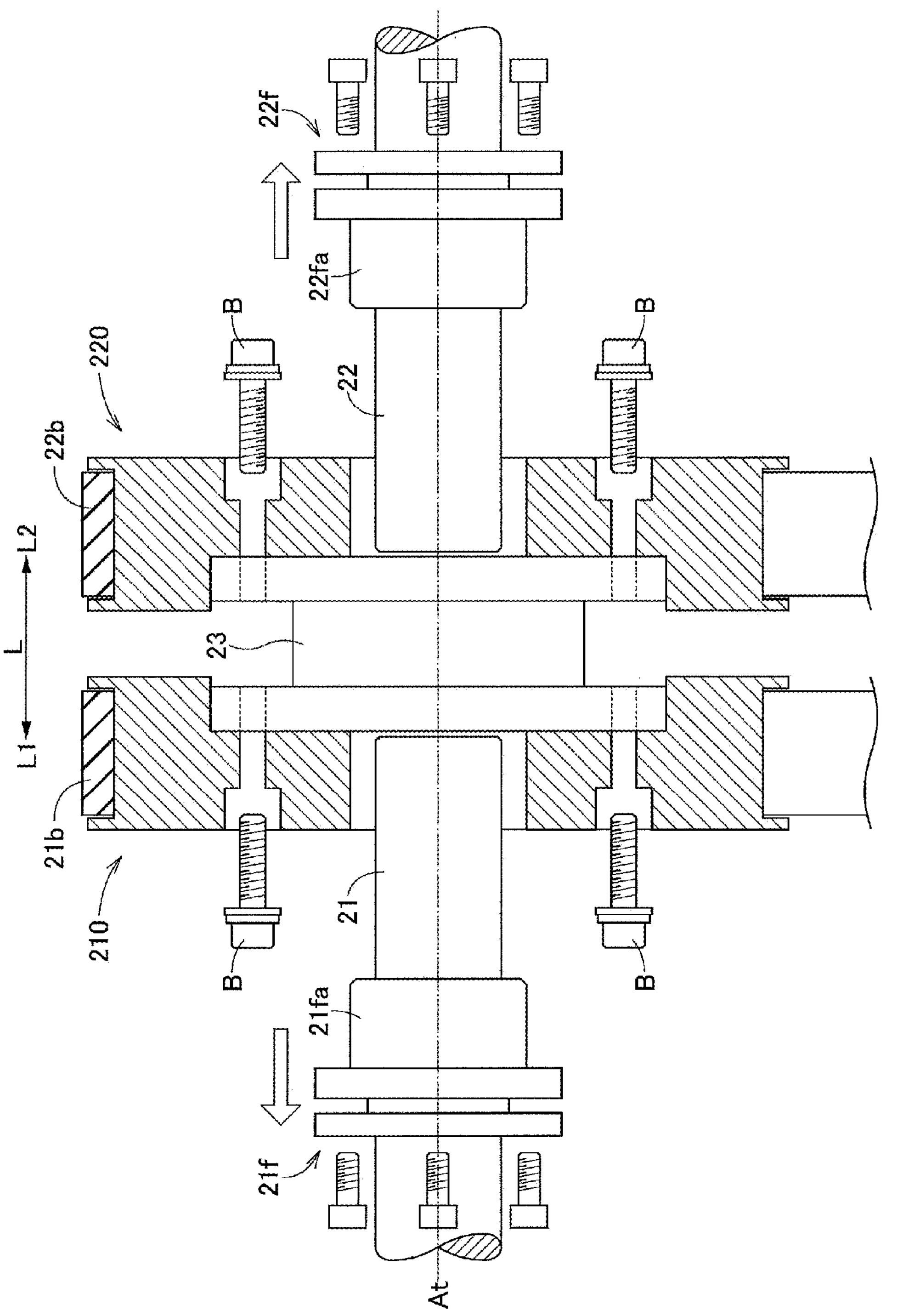
FIG. 5 is a diagram illustrating a workflow for removing a first transmission member.
Figure 6:
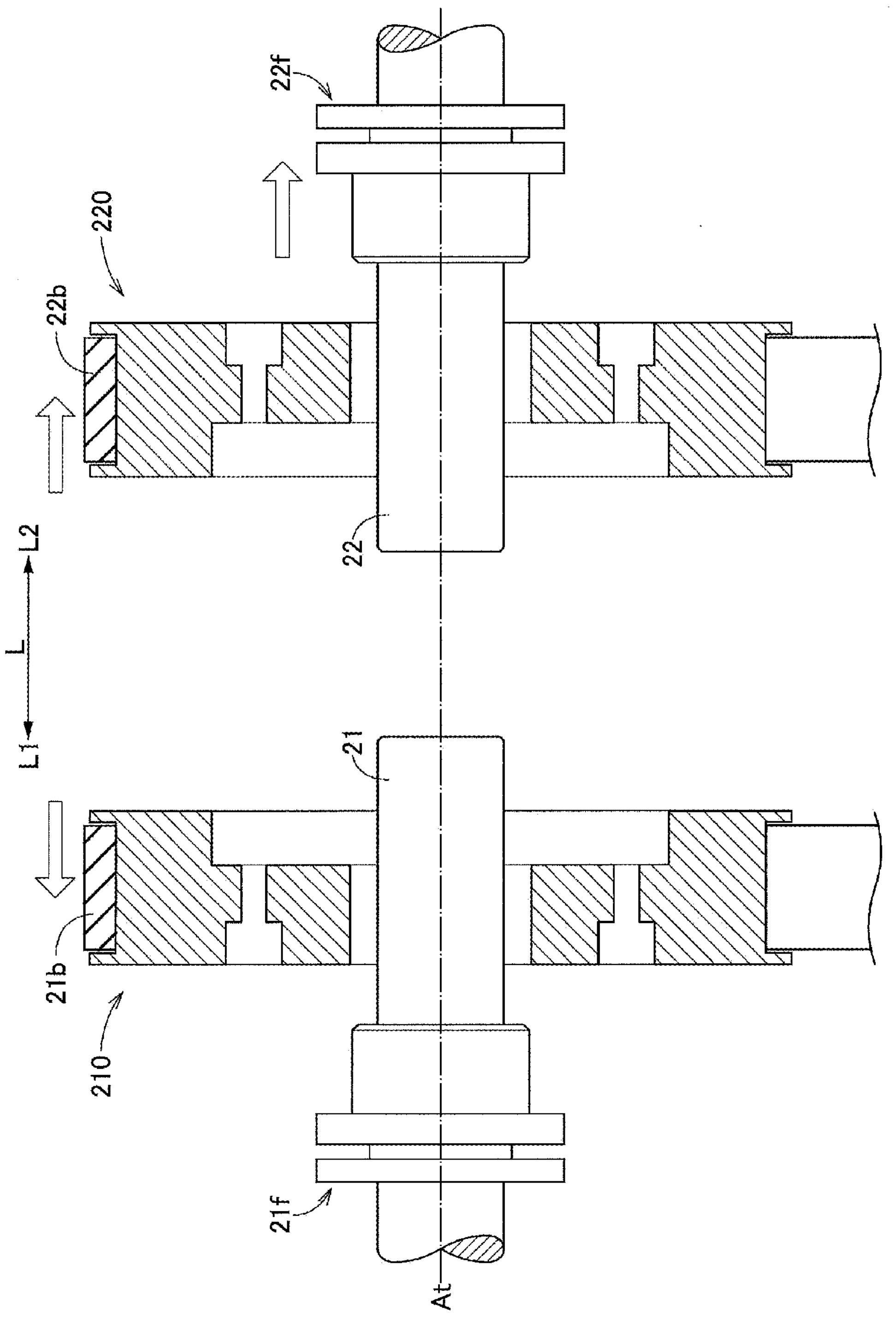
FIG. 6 is a diagram illustrating the workflow for removing the first transmission member.
Figure 7:
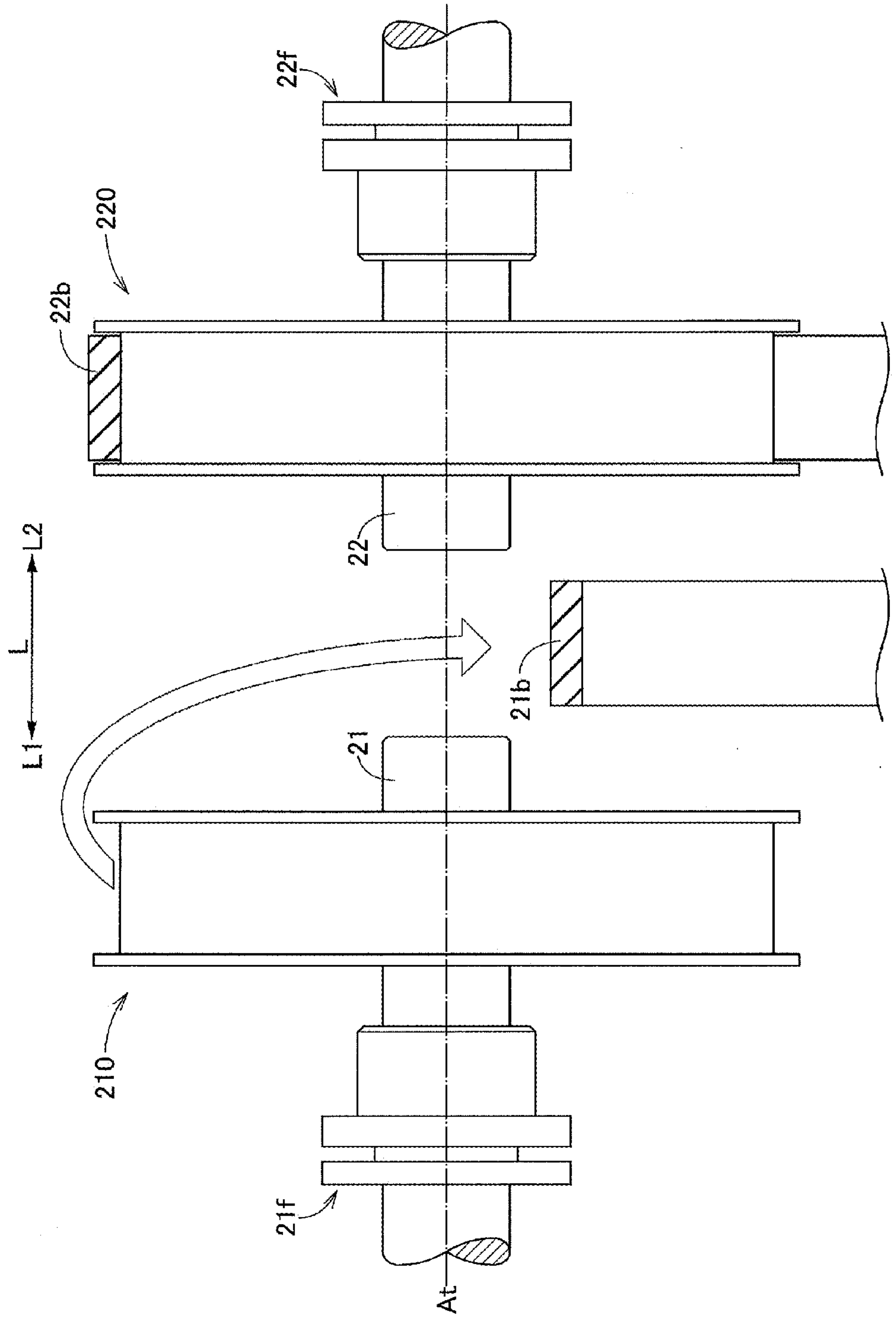
FIG. 7 is a diagram illustrating the workflow for removing the first transmission member.

A connection structure between the first target shaft 21 and the second target shaft 22 will be described in detail with reference to FIG. 3 and subsequent drawings. In addition, FIG. 3 illustrates a state where the first target shaft 21 and the second target shaft 22 are connected (hereinafter simply referred to as "shaft connection state"). FIG. 4 illustrates the first rotator 210 and the second rotator 220 in the shaft connection state with virtual lines. FIGS. 5 to 7 illustrate a workflow for removing the first transmission member 21*b* from the drive transmission device 2.

As illustrated in FIGS. 3 and 4, in the shaft connection state, a part of the shaft coupling 23 on the first axial side L1 is positioned in the inside of the first rotator 210. Further, in the shaft connection state, a part of the shaft coupling 23 on the second axial side L2 is positioned in the inside of the second rotator 220.

In the present embodiment, a first recess 210*a* is provided on a side surface 210Si (hereinafter referred to as "first inner side surface 210Si") of the first rotator 210 on the second axial side L2, which is recessed toward the first axial side L1. A second recess 220*a* is provided on a side surface 220Si (hereinafter referred to as "second inner side surface 220Si") of the second rotator 220 on the first axial side L1, which is recessed toward the second axial side L2. Then, the shaft coupling 23 is configured to be engaged with both the first recess 210*a* and the second recess 220*a*. Thus, in the present embodiment, a part of the shaft coupling 23 is positioned in the inside of both the first and second rotators 210 and 220 in the shaft connection state. Further, this configuration allows the shaft coupling 23 to be easily positioned relative to the first and second rotators 210 and 220 in the radial direction. In addition, the "radial direction" refers to a direction perpendicular to the axial direction L.

With the above configuration, a portion of the shaft coupling 23 that is exposed from the first and second rotators 210 and 220 may be reduced, making it easier to bring the first and second rotators 210 and 220 to closer to each other in the axial direction L. Thus, as illustrated in FIG. 2, the first reference rotator 200A corresponding to the first rotator 210 and the second reference rotator 200B corresponding to the second rotator 220 may be positioned closer to each other in the axial direction L. As a result, one of the first and second reference rotators 200A and 200B, which is located farther away from the drive source M (the first reference rotator 200A in this example), may be made as close as possible to the drive source M. Accordingly, even if the first and second reference rotators 200A and 200B are pulled toward the side where the first and second rotators 210 and 220 are located (the target axis At side), the bending of the reference shaft 20 to which the first and second reference rotators 200A and 200B are attached may be prevented.

As illustrated in FIGS. 3 and 4, the first rotator 210 is fixed to the first target shaft 21 by a first fixing mechanism **21*f*. In the present embodiment, the first fixing mechanism 21*f* is configured to fix the first rotator 210 to the first target shaft 21 from the radial inner side. The first fixing mechanism 21*f* includes a radial positioner 21*fa*, which is positioned between the first target shaft 21 and the first rotator 210 in the radial direction. The radial positioner 21*fa* is configured to freely expand or contract in diameter. When the radial positioner 21*fa* expands in diameter, the first target shaft 21 and the first rotator 210 are radially pressed and fixed to each other. When the radial positioner 21*fa* contracts in diameter, the fixation between the first target shaft 21 and the first rotator 210 is released. The first rotator 210 is movable in the axial direction L along the first target shaft 21 in a state where the fixation by the first fixing mechanism 21*f* is released (see, e.g., FIG. 6**).

In this example, the first fixing mechanism **21*f*** is configured using a friction-type fastener. The friction-type fastener may be a wedge-type fastener, which changes the diameter difference between the inner peripheral surface in contact with a fastening object and the outer peripheral surface thereof through bolt insertion, or a hydraulic-type fastener, which changes the diameter difference using a hydraulic pressure.

As described above, the shaft coupling 23 is configured to be engaged with the first recess **210*a* of the first rotator 210. Furthermore, in the present embodiment, the shaft coupling 23 and the first rotator 210 are fastened using a fastener B (e.g., a bolt). Multiple fasteners B are inserted into the first rotator 210 from a side surface 210So (hereinafter referred to as "first outer side surface 210So") of the first rotator 210 on the first axial side L1, so that each fastener B fastens the first rotator 210 and the shaft coupling 23. Each fastener B is screwed into a portion of the shaft coupling 23 engaged with the first recess 210*a*. Thus, in the present embodiment, the first rotator 210 is engaged with the shaft coupling 23 at the first inner side surface 210Si, and is fastened to the shaft coupling 23 by the multiple fasteners B inserted from the first outer side surface 210So. Further, each fastener B is inserted into the first rotator 210 from the first axial side L1 in the radial outer side of the first target shaft 21**.

The second rotator 220 is fixed to the second target shaft 22 by a second fixing mechanism **22*f*. In the present embodiment, the second fixing mechanism 22*f* is configured to fix the second rotator 220 to the second target shaft 22 from the radial inner side. The second fixing mechanism 22*f* includes a radial positioner 22*fa*, which is positioned between the second target shaft 22 and the second rotator 220 in the radial direction. The radial positioner 22*fa* is configured to freely expand or contract in diameter. When the radial positioner 22*fa* expands in diameter, the second target shaft 22 and the second rotator 220 are radially pressed and fixed to each other. When the radial positioner 22*fa* contracts in diameter, the fixation between the second target shaft 22 and the second rotator 220 is released. The second rotator 220 is movable in the axial direction L along the second target shaft 22 in a state where the fixation by the second fixing mechanism 22*f* is released (see, e.g., FIG. 6**).

In this example, the second fixing mechanism **22*f*** is configured using a friction-type fastener. The friction-type fastener may be a wedge-type fastener, which changes the diameter difference between the inner peripheral surface in contact with a fastening object and the outer peripheral surface thereof through bolt insertion, or a hydraulic-type fastener, which changes the diameter difference using a hydraulic pressure.

As described above, the shaft coupling 23 is configured to be engaged with the second recess **220*a* of the second rotator 220. Furthermore, in the present embodiment, the shaft coupling 23 and the second rotator 220 are fastened using a fastener B (e.g., a bolt). Multiple fasteners B are inserted into the second rotator 220 from a side surface 220So (hereinafter referred to as "second outer side surface 220So") of the second rotator 220 on the second axial side L2, so that each fastener B fastens the second rotator 220 and the shaft coupling 23. Each fastener B is screwed into a portion of the shaft coupling 23 engaged with the second recess 220*a*. Thus, in the present embodiment, the second rotator 220 is engaged with the shaft coupling 23 at the second inner side surface 220Si, and is fastened to the shaft coupling 23 by the multiple fasteners B inserted from the second outer side surface 220So. Further, each fastener B is inserted into the second rotator 220 from the second axial side L2 in the radial outer side of the second target shaft 22**.

The first target shaft 21 and the second target shaft 22 have the above-described connection structure. As described above, the first target shaft 21 and the second target shaft 22 are arranged with a gap in the axial direction L, but in the shaft connection state, the gap is filled by the shaft coupling 23. Therefore, when the shaft connection state is released and the shaft coupling 23 is removed, the gap between the two shafts is exposed. This gap is used when removing the first transmission member **21*b* or the second transmission member 22*b*, which is consumable, from the drive transmission device 2. Thus, this gap is formed larger than the width of each of the first transmission member 21*b* and the second transmission member 22*b***.

FIGS. 5 to 7 illustrate a workflow for removing the first transmission member **21*b* from the drive transmission device 2. Hereinafter, the removal of the first transmission member 21*b*** will be described.

As illustrated in FIG. 5, first, the first fixing mechanism **21*f* contracts in diameter, thereby releasing the fixation between the first target shaft 21 and the first rotator 210. Then, the multiple fasteners B are removed from the first rotator 210. Further, the release of the fixation by the second fixing mechanism 22*f* and the removal of the multiple fasteners B from the second rotator 220 are performed. In this state, the first rotator 210 and the second rotator 220 are connected only by the engagement with the shaft coupling 23**.

As illustrated in FIG. 6, the first rotator 210 and the shaft coupling 23 are disengaged, and the first rotator 210 is moved along the first target shaft 21 toward the first axial side L1. Similarly, the second rotator 220 and the shaft coupling 23 are disengaged, and the second rotator 220 is moved along the second target shaft 22 toward the second axial side L2. Then, the shaft coupling 23, which has been disengaged from both the first rotator 210 and the second rotator 220, is removed. Thus, the gap between the first target shaft 21 and the second target shaft 22 in the axial direction L is exposed.

As illustrated in FIG. 7, the first transmission member 21*b* is removed from the first rotator 210. Since the first transmission member 21*b* is pulled by a tensioner (not illustrated) while being attached to the first rotator 210, the pulling of the first transmission member 21*b* by the tensioner is released before removing the first transmission member 21*b* from the first rotator 210. After removing the first transmission member 21*b* from the first rotator 210, the first transmission member 21*b* is passed through the gap between the first target shaft 21 and the second target shaft 22 and is removed from the drive transmission device 2. This allows for the repair or replacement of the first transmission member 21*b*.

The above description has described the removal of the first transmission member 21*b* from the drive transmission device 2, but the same procedure may also be applied when removing the second transmission member 22*b* from the drive transmission device 2.

Other Embodiments

The following describes other embodiments.

(1) The above embodiment has described the example in which the reference shaft 20 is a driving shaft connected to the drive source M and the first and second target shafts 21 and 22 are driven shafts that are driven by the rotation of the reference shaft 20. However, without limitation to this example, the reference shaft 20 may be a driven shaft and the first and second target shafts 21 and 22 may be driving shafts. In other words, the drive source M may be connected to the first target shaft 21 or the second target shaft 22.

(2) The above embodiment has described the example in which the first rotator 210 is removably fixed to the first target shaft 21 by the first fixing mechanism 21*f*, and the second rotator 220 is removably fixed to the second target shaft 22 by the second fixing mechanism 22*f*. However, without limitation to this example, the first rotator 210 may be integrally (non-removably) formed with the first target shaft 21. Alternatively, the second rotator 220 may be integrally (non-removably) formed with the second target shaft 22.

(3) The above embodiment has described the example in which the first transmission member 21*b* is configured using a belt and the first rotator 210 and first reference rotator 200A are configured using pulleys. However, without limitation to this example, the first transmission member 21*b* may be configured using a chain, and the first rotator 210 and first reference rotator 200A may be configured using sprockets.

(4) The above embodiment has described the example in which the second transmission member 22*b* is configured using a belt and the second rotator 220 and second reference rotator 200B are configured using pulleys. However, without limitation to this example, the second transmission member 22*b* is configured using a chain and the second rotator 220 and second reference rotator 200B are configured using sprockets.

(5) The above embodiment has described the example in which the first rotator 210 and the second rotator 220 are arranged with a gap in the axial direction L. However, without limitation to this example, the first rotator 210 and the second rotator 220 may be arranged to come into contact with each other in the axial direction L.

(6) The above embodiment has described the example in which the shaft coupling 23 is connected to both the first rotator 210 and the second rotator 220, but is not connected to the first target shaft 21 and the second target shaft 22. However, without limitation to this example, the shaft coupling 23 may also be connected to the first target shaft 21 and the second target shaft 22.

(7) The above embodiment has described the example in which the first winding member 11*b* and the second winding member 12*b* are configured using belts. However, without limitation to this example, at least one of the first winding member 11*b* and the second winding member 12*b* may be configured using a wire or a chain.

(8) The above embodiment has described the example in which the drive transmission device 2 is applied to the lifting device 100. However, without limitation to this example, the drive transmission device 2 may also be applied to various other drive devices such as conveyors or transfer devices.

(9) The above embodiment has described the example in which the lifting device 100 is configured as a lifter that raises or lowers the transfer vehicle V via the lifting target object R1. However, without limitation to this example, the lifting device 100 may also be configured as a lifter mounted on a stacker crane, or may be configured as a lifter for raising or lowering the article W in an automated warehouse.

(10) Further, the configuration disclosed in the above-described embodiment may be combined with those of other embodiments as long as no contradictions arise. As for other configurations as well, the embodiments disclosed herein are merely examples in all respects. Thus, various modifications can be made as appropriate without departing from the spirit of the present disclosure.

Summary of Present Embodiment

The following describes the summary of the present embodiment.

A drive transmission device includes:

a reference shaft positioned on a reference axis;

a first target shaft and a second target shaft, positioned on a target axis that is a separate axis parallel to the reference axis;

a first reference rotator and a second reference rotator attached to the reference shaft;

a first rotator attached to the first target shaft;

a second rotator attached to the second target shaft;

a first endless transmission member wound around the first reference rotator and the first rotator;

a second endless transmission member wound around the second reference rotator and the second rotator; and a shaft coupling configured to connect the first target shaft and the second target shaft to each other, in which when a direction parallel to the reference axis and the target axis is defined as an axial direction, the first target shaft and the second target shaft are arranged with a gap in the axial direction, and the first rotator and the second rotator are positioned on the target axis so as to be arranged side by side in the axial direction, and the shaft coupling is connected to both the first rotator and the second rotator.

According to this configuration, since the first target shaft and the second target shaft are arranged with a gap in the axial direction, when replacing the first transmission member or the second transmission member, the first transmission member removed from the first rotator or the second transmission member removed from the second rotator may be easily removed through the gap between the first target shaft and the second target shaft by removing the shaft coupling to create a gap between the first rotator and the second rotator. Further, according to this configuration, instead of directly connecting the first target shaft and the second target shaft, the first target shaft and the second target shaft may be indirectly connected by connecting the first rotator and the second rotator using the shaft coupling. Therefore, the shaft coupling, which functions to connect the first target shaft and the second target shaft, is subjected to fewer restrictions due to on the size and shape of the first and second target shafts. Thus, according to this configuration, it is possible to achieve the higher flexibility of connection between the first target shaft and the second target shaft, which are arranged on the same axis with a gap for the insertion of the first transmission member or the second transmission member therethrough.

When a side where the first rotator is positioned relative to the second rotator in the axial direction is defined as a first axial side, and an opposite side is defined as a second axial side, a first recess may be provided on a side surface of the first rotator on the second axial side to be recessed toward the first axial side, and a second recess may be provided on a side surface of the second rotator on the first axial side to be recessed toward the second axial side, and the shaft coupling may be configured to be engaged with both the first recess and the second recess.

Since this configuration allows the shaft coupling to be engaged with both the first recess and the second recess, it is easier to enhance the rigidity of the connection between the first target shaft and the second target shaft via the shaft coupling. Further, since the first and second recesses facilitate the positioning of the shaft coupling, it is easier to improve the workability of the process of connecting the shaft coupling to both the first and second rotators.

The first rotator may be fixed to the first target shaft by a first fixing mechanism, the second rotator may be fixed to the second target shaft by a second fixing mechanism, the first rotator may be movable in the axial direction along the first target shaft when fixation by the first fixing mechanism is released, and the second rotator may be movable in the axial direction along the second target shaft when fixation by the second fixing mechanism is released.

According to this configuration, it is possible to enhance the ease of attaching or detaching the shaft coupling to or from the first and second rotators, and furthermore, the ease of attaching or detaching the first transmission member wound around the first rotator and the second transmission member wound around the second rotator.

A lifting device equipped with the drive transmission device includes:

- a drive source;
- a lifting mechanism driven by the drive source; and
- a lifting target object configured to be raised or lowered by the lifting mechanism,
- wherein the lifting mechanism includes a first output rotator, a second output rotator, a first winding member wound around the first output rotator and configured to be freely wound or unwound, and a second winding member wound around the second output rotator and configured to be freely wound or unwound,
- the first winding member and the second winding member are connected to different locations on the lifting target object,
- the first output rotator is connected to rotate in conjunction with the first target shaft, and
- the second output rotator is connected to rotate in conjunction with the second target shaft.

According to this configuration, the lifting target object may be raised or lowered by rotationally driving the first and second output rotators using the drive source while keeping the lifting target object stably suspended by multiple winding members. Furthermore, according to this configuration, the driving force of the drive source may be appropriately transmitted to the first and second target shafts, and even if either the first transmission member or the second transmission member is detached or dislodged, the remaining transmission member may still transmit the driving force of the drive source to both the first and second target shafts. Thus, according to this configuration, the driving force of the drive source may be appropriately transmitted to the lifting target object, ensuring that the lifting target object is reliably raised or lowered.

The technology according to the present disclosure may be utilized in a drive transmission device and a lifting device equipped with the drive transmission device.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A drive transmission device comprising:

- a reference shaft positioned on a reference axis;
- a first target shaft and a second target shaft, positioned on a target axis that is a separate axis parallel to the reference axis;
- a first reference rotator and a second reference rotator attached to the reference shaft;
- a first rotator attached to the first target shaft;
- a second rotator attached to the second target shaft;
- a first endless transmitter wound around the first reference rotator and the first rotator;
- a second endless transmitter wound around the second reference rotator and the second rotator; and
- a shaft coupling configured to connect the first target shaft and the second target shaft to each other,
- wherein when a direction parallel to the reference axis and the target axis is defined as an axial direction, the first target shaft and the second target shaft are arranged with a gap in the axial direction,
- the first rotator and the second rotator are positioned on the target axis to be arranged side by side in the axial direction, and
- the shaft coupling is connected to both the first rotator and the second rotator.

2. The drive transmission device according to claim 1, wherein when a side where the first rotator is positioned relative to the second rotator in the axial direction is defined as a first axial side, and an opposite side is defined as a second axial side,

- a first recess is provided on a side surface of the first rotator on the second axial side to be recessed toward the first axial side,
- a second recess is provided on a side surface of the second rotator on the first axial side to be recessed toward the second axial side, and
- the shaft coupling is configured to be engaged with both the first recess and the second recess.

3. The drive transmission device according to claim 1, wherein the first rotator is fixed to the first target shaft by a first fixing mechanism including a fastener, the second rotator is fixed to the second target shaft by a second fixing mechanism including a fastener, the first rotator is movable in the axial direction along the first target shaft when fixation by the first fixing mechanism is released, and the second rotator is movable in the axial direction along the second target shaft when fixation by the second fixing mechanism is released.

4. A lifting device comprising:

the drive transmission device of claim 1;

a drive source;

a lift driven by the drive source; and a lifting target object configured to be raised or lowered by the lift, wherein the lift includes a first output rotator, a second output rotator, a first winding target object wound around the first output rotator and configured to be freely wound or unwound, and a second winding target object wound around the second output rotator and configured to be freely wound or unwound, the first winding target object and the second winding target object are connected to different locations on the lifting target object, the first output rotator is connected to rotate in conjunction with the first target shaft, and the second output rotator is connected to rotate in conjunction with the second target shaft.

* * * * *